United States Patent
Itani et al.

(10) Patent No.: US 7,316,260 B2
(45) Date of Patent: Jan. 8, 2008

(54) MOLD CLAMPING APPARATUS

(75) Inventors: Shinya Itani, Zama (JP); Kouichi Usami, Numazu (JP); Hiroshi Yokoyama, Ebina (JP); Makoto Tsuji, Yamato (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/353,012

(22) Filed: Feb. 14, 2006

(65) Prior Publication Data
US 2006/0182844 A1    Aug. 17, 2006

(30) Foreign Application Priority Data
Feb. 15, 2005   (JP) ............................. 2005-037016

(51) Int. Cl.
*B22D 33/04* (2006.01)
(52) U.S. Cl. ...................... 164/341; 164/312
(58) Field of Classification Search ............... 164/339, 164/342, 312, 341
See application file for complete search history.

(56) References Cited

U.S. PATENT DOCUMENTS

| | | | |
|---|---|---|---|
| 4,571,169 A * | 2/1986 | Shima et al. | 425/451.9 |
| 4,781,568 A * | 11/1988 | Inaba | 425/451 |
| 4,984,980 A * | 1/1991 | Ueno | 425/595 |
| 5,542,465 A * | 8/1996 | Wolniak | 164/341 |
| 2003/0217829 A1* | 11/2003 | Baron et al. | 164/137 |

FOREIGN PATENT DOCUMENTS

JP    10-296736    11/1998

* cited by examiner

*Primary Examiner*—Kevin P. Kerns
(74) *Attorney, Agent, or Firm*—Pillsbury Winthrop Shaw Pittman, LLP

(57) ABSTRACT

There is provided a mold clamping apparatus which has a space-saving apparatus construction and can easily carry out mold replacement. The mold clamping apparatus includes: a base; a fixed die plate, fixed on the base, for mounting a fixed mold thereto; a movable die plate, disposed opposite the fixed die plate and movably on the base, for mounting a movable mold thereto; a mold opening/closing means for moving the movable die plate closer to and away from the fixed die plate; a plurality of mold clamping cylinders provided in the fixed die plate; mold clamping pistons fit in the mold clamping cylinders; a plurality of tie bars, each detachably mountable at one end to each mold clamping piston and penetrating the movable die plate and extending; a coupling means for releasably coupling each tie bar to the movable die plate at a position as determined depending on the sum of the thickness of the fixed mold and the thickness of the movable mold; and a tie bar retreating means which, when the movable die plate is in a backward position to form a space for mold replacement operation, moves at least one of the plurality of tie bars, which obstructs the mold replacement operation, backward to a retreat position.

8 Claims, 3 Drawing Sheets

MOLD CLAMPING APPARATUS

BACKGROUND OF THE INVENTION

1. Field of the Invention

The present invention relates to a mold clamping apparatus for a die casting machine, an injection molding machine, etc., and more particularly to a mold clamping apparatus which has a space-saving apparatus construction and can easily carry out mold replacement.

2. Background Art

FIGS. 5 and 6 shows a so-called hybrid mold clamping apparatus, comprising a combination of an electrical drive mechanism and a hydraulic drive mechanism, as disclosed in, for example, Japanese Patent Laid-Open Publication No. 1998-296736. The mold clamping apparatus includes a fixed die plate 12 for mounting a fixed mold 11 thereto, and a movable die plate 14 for mounting a movable mold 13 thereto. The movable die plate 14 is disposed opposite the fixed die plate 12, and is movable right and left in FIG. 5 along a not-shown guide base provided in a base 15.

The base 15, on both sides of the movable die plate 14 (far and near sides of the movable die plate 14 in FIG. 5), is provided with a pair of drive units 16 each comprising, for example, a servo motor and a pair of mold opening/closing means each comprising, for example, a ball screw shaft 17 which can be rotated in normal and reverse directions by means of the drive section 16. The reference numeral 18 denotes a bearing rotatably supporting the front end of the ball screw shaft 17. A ball screw nut 19, mounted to the movable die plate 14, is threadably coupled to the ball screw shaft 17. The movable die plate 14 moves in a direction closer to the fixed die plate 12 by the normal rotation of the ball screw shaft 17, while the movable die plate 14 moves in a direction away from the fixed die plate 12 by the reverse rotation of the ball screw shaft 17, thus closing/opening molds.

Mold clamping cylinders 20 are provided in the four corners of the fixed die plate 12, and a mold clamping piston 21 is fit in each mold clamping cylinder 20. The right end in FIG. of a tie bar 22 is removably inserted into the mold clamping piston 21. A groove 23 is formed at the right end of the tie bar 22, and an openable/closable clamp 24, provided at the right end of the mold clamping piston 21, detachably engages the groove 23.

The tie bar 22 penetrates the movable die plate 14 and extends to the left in FIG. 5, and a large number of annular grooves 25 (which can be a screw) are formed at an even pitch in the peripheral surface of that portion of the tie bar 22 which extrudes from the movable die plate 14. Half nuts 26, which are mounted to the movable die plate 14, each detachably engage the annular grooves 26. Each half nut 26 is opened/closed by a not-shown driving device, and constitutes a coupling means for releasably coupling the tie bar 22 to the movable die plate 14.

The mold clamping apparatus performs molds opening/closing operation and molds clamping operation in the following manner, with the fixed mold 11 mounted to the fixed die plate 12 and the movable mold 13 mounted to the movable die plate 14.

When closing the molds, the half nuts 26 are opened to release the coupling between the tie bars 22 and the movable die plate 14. Thereafter, the ball screw shafts 17 are rotated to move the movable die plate 14 forward to a position shortly before the fixed mold 11 and the movable mold 13 are completely closed. Next, the half nuts 26 are closed, and the mold clamping cylinders 20 move the pistons. 21 to the right, whereby the tie bars 22 are pulled in to the right in FIG. 5 and the fixed mold 11 and the movable mold 13 are clamped firmly. When opening the molds, on the other hand, the mold clamping pistons 21 of the mold clamping cylinders 20 move to the left to push out the tie bars 22 to the left in FIG. 5 by a predetermined distance to thereby release the clamping of the molds. Thereafter, the half nuts 26 are opened to release the coupling between the tie bars 22 and the movable die plate 14, and the ball screw shafts 17 are rotated to move the movable die plate 14 backward.

The above conventional hybrid mold clamping apparatus, comprising the electrical and hydraulic drive mechanisms, is characterized by its downsized construction as compared to a mold clamping apparatus of the hydraulically-driven type that opens or closes, or clamps molds by moving a movable die plate 14 by means of a cylinder or a link mechanism directly coupled to the movable die plate 14.

The conventional hybrid mold clamping apparatus, however, has the following problem involved in mold replacement operation: FIG. 6 shows the position of the movable die plate 14 upon mold replacement. As shown in FIG. 6, in order to perform a mold replacement operation, it is necessary to pull the right ends of the tie bars 22 out of the fixed die plate 12 so as to secure a space for mold replacement on the mold-mounting side of the fixed die plate 12.

Thus, in order to smoothly perform mold replacement with the conventional mold clamping apparatus, the apparatus must be designed to be capable of moving the movable die plate 14 further backward from the maximum backward limit position in usual opening/closing of molds to the position shown in FIG. 6. The conventional apparatus, therefore, employs such a long moving stroke of the movable mold 14 as to enable the tie bars 22 sufficiently move away from the fixed die plate 12, thereby securing an operating space for smoothly performing mold replacement. It is, therefore, necessary to use a long base 15, ball screw shafts 17 with a long stroke, etc. solely for mold replacement, which poses an obstacle to further downsizing of the apparatus.

SUMMARY OF THE INVENTION

It is therefore an object of the present invention to solve the above problem in the prior art and provide a mold clamping apparatus which has a space-saving apparatus construction and can easily carry out molds replacement.

In order to achieve the object, the present invention provides a mold clamping apparatus comprising: a base; a fixed die plate, fixed on the base, for mounting a fixed mold thereto; a movable die plate, disposed opposite the fixed die plate and movably on the base, for mounting a movable mold thereto; a mold opening/closing means for moving the movable die plate closer to and away from the fixed die plate; a plurality of mold clamping cylinders provided in the fixed die plate; mold clamping pistons fit in the mold clamping cylinders; a plurality of tie bars, each detachably mountable at one end to each mold clamping piston and penetrating the movable die plate and extending; a coupling means for releasably coupling each tie bar to the movable die plate at a position as determined depending on the sum of the thickness of the fixed mold and the thickness of the movable mold; and a tie bar retreating means which, when the movable die plate is in a backward position to form a space for mold replacement operation, moves at least one of the plurality of tie bars, which obstructs the mold replacement operation, backward to a retreat position.

The mold clamping apparatus of the present invention is provided with the tie bar retreating means for pulling the tie bars out of the fixed die plate in order to secure a space for mold replacement operation between the fixed die plate and the movable die plate. With the provision of the tie bar retreating means, only the tie bars can be moved backward upon mold replacement while retaining the movable die plate in the maximum backward limit position in usual opening/closing of molds, i.e., without moving the movable die plate further backward from the maximum backward limit position. This can minimize the moving range of the movable die plate and secure an operating space for smoothly performing mold replacement and, in addition, can downsize the apparatus.

DETAILED DESCRIPTION OF THE PREFERRED EMBODIMENT

Figure 5:
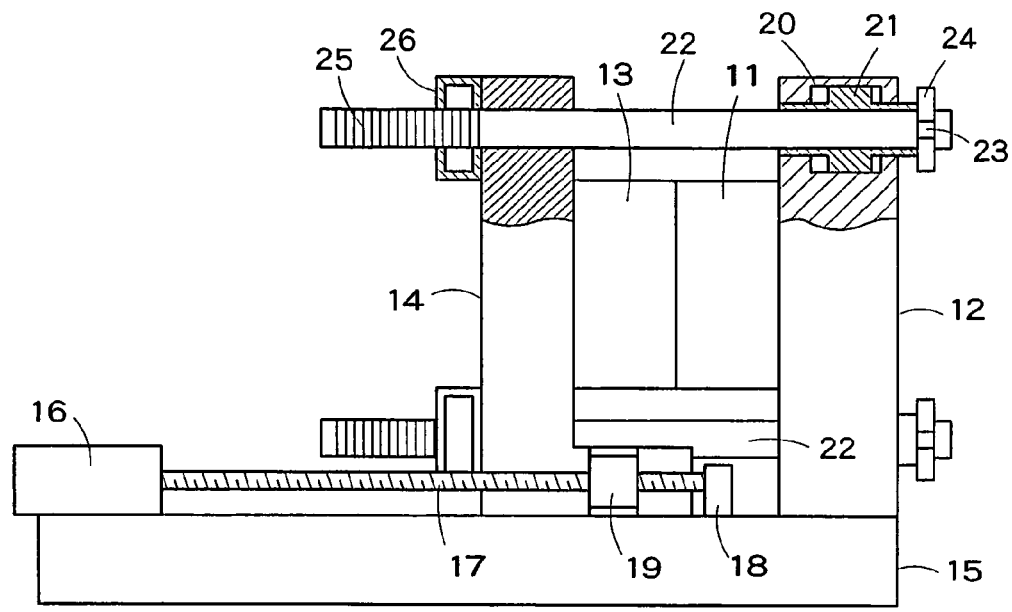
FIG. 5 is a front view, partly broken away, of a conventional mold clamping apparatus.
Figure 6:
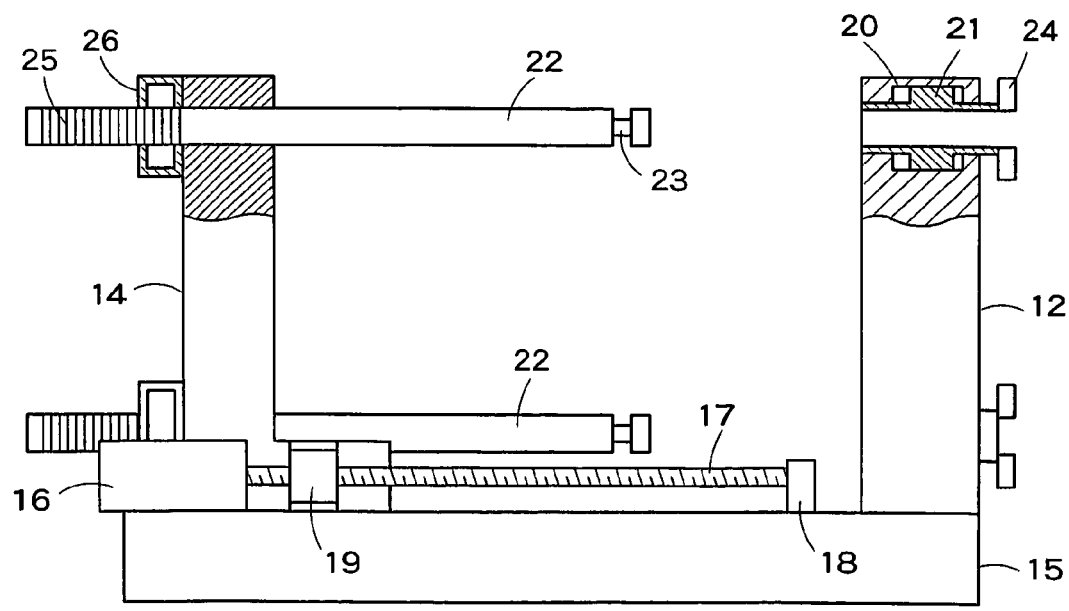
FIG. 6 is a front view corresponding to FIG. 5, showing the conventional mold clamping apparatus as the tie bars shown in FIG. 5 are pulled out.

A preferred embodiment of the present invention will now be described with reference to FIGS. 1 to 4. In the mold clamping apparatus shown in FIGS. 1 to 4, the same members or elements as those of the conventional apparatus shown in FIGS. 5 and 6 are given the same reference numeral.

Figure 1:
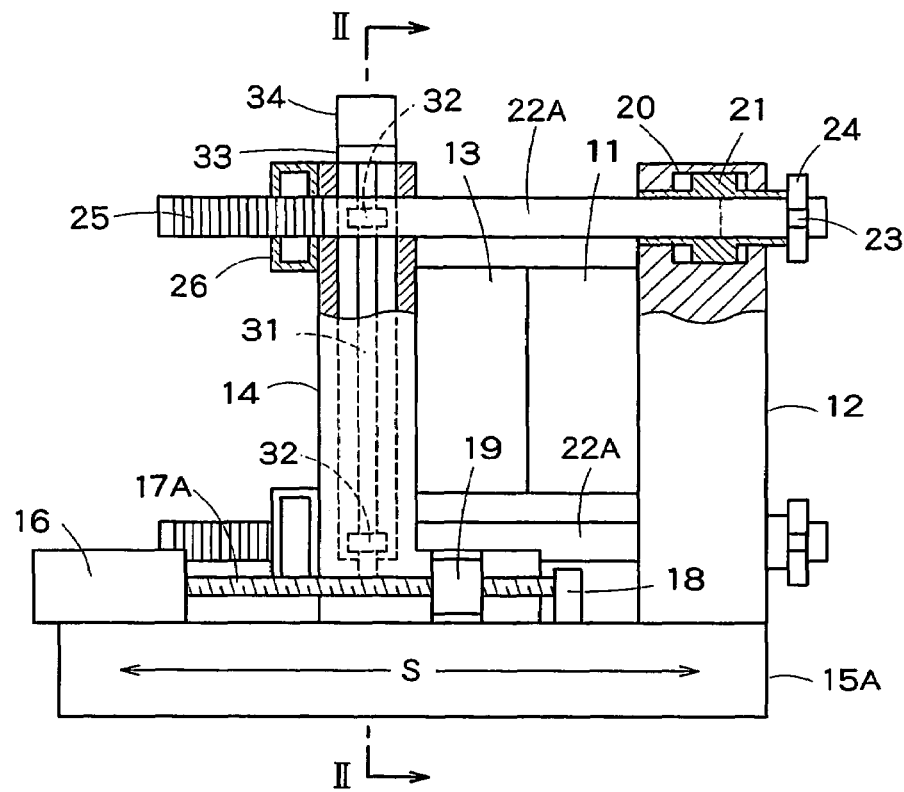
FIG. 1 is a front view, partly broke away, of a mold clamping apparatus according to an embodiment of the present invention.

Referring to FIG. 1, a fixed mold 11 is mounted to a fixed die plate 12 fixed at one end of a base 15, and a movable mold 13 is mounted to a movable die plate 14 disposed opposite the fixed die plate 12. The movable die plate 14 is designed to be movable right and left along a not-shown guide base provided in the base 15.

On the base 15, on both sides of the movable die plate 14 (far and near sides of the movable die plate 14 in FIG. 1, the near side shown), there are provided a pair of drive sections 16 each comprising, for example, a servo motor and a pair of mold opening/closing means each comprising, for example, a ball screw shaft 17 which can be rotated in normal and reverse directions by means of the drive section 16. The reference numeral 18 denotes a bearing rotatably supporting the front end of the ball screw shaft 17. A ball screw nut 19, mounted to the movable die plate 14, is threadably coupled to the ball screw shaft 17. The movable die plate 14 moves in a direction closer to the fixed die plate 12 by the normal rotation of the ball screw shaft 17, while the movable die plate 14 moves in a direction away from the fixed die plate 12 by the reverse rotation of the ball screw shaft 17, thus closing/opening molds.

Mold clamping cylinders 20, which generate a mold clamping force after clamping molds, are provided in the four corners of the fixed die plate 12, and a mold clamping piston 21 is slidably fit in each mold clamping cylinder 20. The right end in FIG. 1 of a tie bar 22A is removably inserted into each of the four mold clamping pistons 21. A groove 23 is formed at the right end of the tie bar 22A, and an openable/closable clamp 24, provided at the right end of the mold clamping piston 21, detachably engages the groove 23.

The tie bar 22A penetrates the movable die plate 14 and extends to the left in FIG. 1, and a large number of annular grooves 25 (which can be a screw) are formed at an even pitch in the end portion of the tie bar 22 which extrudes from the movable die plate 14. Half nuts 26, which are mounted to the movable die plate 14, each detachably engage the annular grooves 26. Each half nut 26 is opened/closed by a not-shown driving device, and constitutes a coupling means for releasably coupling the tie bar 22A to the movable die plate 14.

As is apparent from comparison between FIG. 1 and FIG. 5, the base 15A of the mold clamping apparatus of the present invention is shorter than the base 15 of the conventional mold clamping apparatus shown in FIG. 5. In particular, the movable die plate 14 can be moved backward to the left end in FIG. 1 of the base 15A and the position of the movable die plate 14 shown in FIG. 4 corresponds to the maximum backward limit position of the movable die plate 14 in usual opening/closing of molds (maximum stroke S). Consequently, the ball screw shafts 17A are also shorter than the ball screw shafts 17 of FIG. 5.

Figure 3:
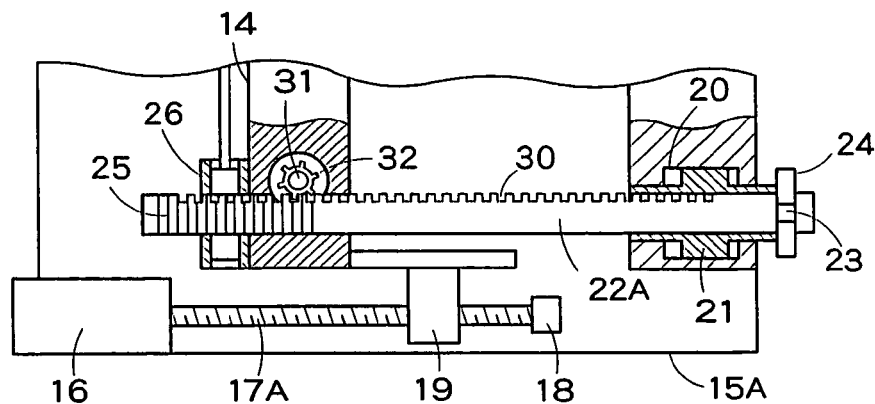
FIG. 3 is a cross-sectional view taken along the line III-III of FIG. 2.

In the mold clamping apparatus of the present invention, the tie bar 22A is provided with a rack 30 extending in the long direction over almost the full length of the tie bar 22A, as shown in FIG. 3. The rack 30, together with a pinion 32, constitutes a tie bar retreating means for moving the tie bar 22A backward to a predetermined retreat position.

Figure 2:
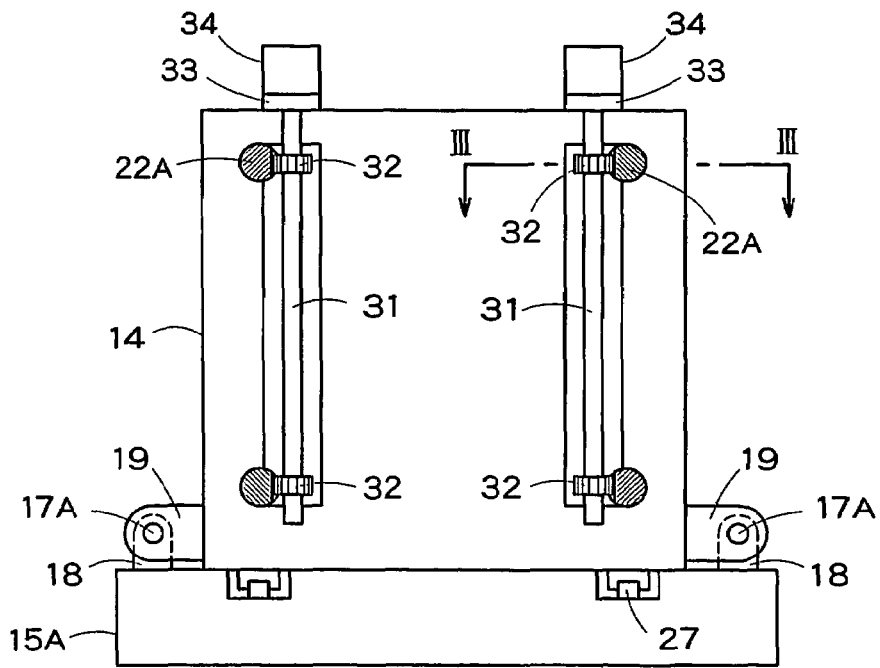
FIG. 2 is a cross-section view taken along the line II-II of FIG. 1.

In this embodiment, as shown in FIG. 2, two parallel shafts 31 are mounted to the movable die plate 14. Pinions 32, each engaging the rack 30 of each tie bar 22A, are attached to the shafts 31. The shaft 31 is coupled via a clutch 33 to a drive section 34, such as a servo motor, and thus can be rotated in normal or reverse direction. The pinions 32 rotate while engaging the racks 30, thereby moving the tie bars 22A in the long direction by a predetermined distance.

The reference numeral 27 in FIG. 2 denotes a guide rail supporting the movable die plate 14 such that it is movable in a direction closer to/away from the fixed die plate 12. The operation of the mold clamping apparatus having the above construction will now be described. Usual operations for mold opening/closing and mold clamping are the same as the above-described operations of the conventional apparatus, and hence a description thereof is omitted and a description will be made only of an operation for mold replacement.

First, the clutches 33 are disengaged to disconnect the shafts 31 from the drive sections 34, and the half nuts 26 are opened to release their engagement with the annular grooves 25A of the tie bars 22A. Next, the servo motors of the drive sections 16 are actuated to rotate the ball screw shafts 17A, thereby moving the movable die plate 14 to the maximum backward limit position, as shown in FIG. 4.

Figure 4:
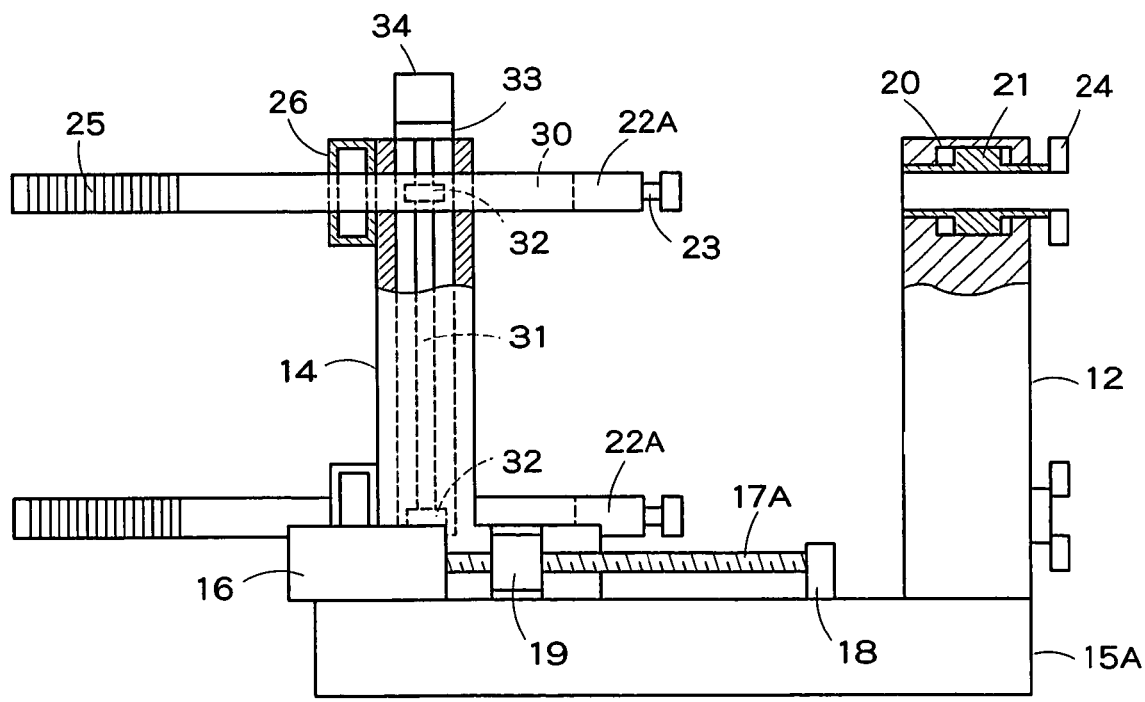
FIG. 4 is a front view corresponding to FIG. 1, showing the mold clamping apparatus as the tie bars shown in FIG. 1 are pulled out.

Next, clamps 24 are opened as shown in FIG. 4, and the clutches 33 are engaged to connect the drive sections 34 to the shafts 31. The servo motors of the drive sections 34 are then actuated and the rotation of each servo motor is transmitted via the shaft 31 to the pinions 32. The pinions 32 rotate while engaging the racks 30 provided in the tie bars 22A, thereby moving the tie bars 22A to the left in FIG. 4. During this operation, only the tie bars 22A move backward while the movable die plate 14 remains stationary in the maximum backward limit position. The right ends in FIG. 4 of the tie bars 22A move out of the mold clamping pistons 21, and finally come to a position at a predetermined distance from the fixed die plate 12, forming a space for mold replacement on the left side in FIG. 4 of the fixed die plate 12, as shown in FIG. 4.

Thereafter, a fixed mold 11 and a movable mold 13 as shown in. FIG. 1 are carried in to the left side of the fixed die plate 12. The drive sections 16 are then actuated to move forward the movable die plate 14 toward the fixed die plate 12 by means of the ball screw shafts 17A, whereby the fixed mold 11 and the movable mold 13 are held between the fixed die plate 12 and the movable die plate 14, so that the molds 11, 13 can be mounted to the die plates 12, 14, respectively.

Next, the servo motors of the drive sections 34 are actuated reversely and the rotation of each servo motor is transmitted from the shaft 31 to the pinions 32. The pinions 32 rotate while engaging the racks 30, thereby moving the tie bars 22A to the right in FIG. 4, whereby the right ends of the tie bars 22A are inserted into the mold clamping pistons 21. The clamps 24 are then closed as shown in FIG. 1 to couple the tie bars 22A to the die clamping pistons 21. Thereafter, the clutches 33 are disengaged to disconnect the shafts 31 from the drive sections 34. A pressurized oil is supplied into an oil chamber on the mold-opening side of each mold clamping cylinder 20, whereby the mold clamping piston 21 moves slightly to the left in FIG. 1. At this moment, the movable die plate 13 is slightly spaced apart from the fixed die plate 11. Each half nuts 26 is then closed and engaged with the annular grooves 25 at the position corresponding to the thickness of the molds 11, 13, thereby completing mold replacement. Usual mold opening/closing and mold clamping operations will follow, and the half nuts 26 will be opened and closed in each operation.

While the present invention has been particularly shown and described with reference to the embodiment thereof, it will be appreciated by those skilled in the art that the invention is not limited to the particular embodiment thereof and various changes or modifications could be made therein. For example, though in the above-described embodiment the four tie bars 22A are all pulled out of the fixed die plate 12, it is also possible to pull out, for example, only one or two upper tie bars 22A that may obstruct mold replacement. When the movable die plate 14 moves while being guided by the tie bars 22A in usual opening/closing of molds, the pinions 32 rotate while engaging the racks 30. The provision of the clutch 33 between the shaft 31 and the drive section 34 according to this embodiment can prevent consequent idling of the drive section 34 and the attendant load increase. In case the load is acceptable, the clutches 33 may be omitted and the drive section 34 may be directly connected to the shaft 31. Further, it is possible to interpose a clutch between the shaft 31 and the pinion 32. It is also possible to make the pinion 32 detachable from the rack 30. Furthermore, instead of employing as a mold opening/closing means the electrically-driven feeding mechanism comprised of the ball screw shaft 17A, which is rotationally driven by the drive section 16 such as a servo motor, and the ball screw nut 19, it is also possible to employ a hydraulically-driven feeding mechanism comprised of an oil hydraulic cylinder and a piston.

What is claimed is:

1. A mold clamping apparatus comprising:
   a base;
   a fixed die plate, fixed on the base, for mounting a fixed mold thereto;
   a movable die plate, disposed opposite the fixed die plate and movably on the base, for mounting a movable mold thereto;
   a mold opening/closing means for moving the movable die plate closer to and away from the fixed die plate;
   a plurality of mold clamping cylinders provided in the fixed die plate, each mold clamping cylinder being fitted with a mold clamping piston;
   a plurality of tie bars, each tie bar being detachably mountable at one end to each mold clamping piston and penetrating the movable die plate and extending;
   a coupling means for releasably coupling each tie bar to the movable die plate at a position that is determined based on the sum of the thickness of the fixed mold and the thickness of the movable mold; and
   a tie bar retreating means configured to move at least one of the plurality of tie bars that obstructs a mold replacement operation, such that when the movable die plate is in a backward position to form a space for the mold replacement operation, the tie bar retreating means moves the at least one tie bar backward to a retreat position,
   wherein the tie bar retreating means comprises a rack provided in the at least one tie bar along a long direction, a pinion that engages the rack and is rotatably provided in the movable die plate, and a drive section for rotating the pinion in opposite directions, and
   wherein said drive section is configured to be independent of the mold opening/closing means.

2. The mold clamping apparatus according to claim 1, wherein the tie bar retreating means includes a transmission shaft for simultaneously transmitting rotation to the pinion engaging the racks of upper and lower tie bars.

3. The mold clamping apparatus according to claim 2 further comprising a clutch for transmitting rotation from the transmission shaft to the pinions or shutting off the transmission.

4. The mold clamping apparatus according to claim 1 or 2, wherein the rack is provided over the full length of the tie bar.

5. The mold clamping apparatus according to claim 1, wherein the base has a length corresponding to the maximum stroke of the movable die plate in usual opening/closing of molds.

6. The mold clamping apparatus according to claim 1, wherein the mold opening/closing means is comprised of a ball screw mechanism for moving the movable die plate forward and backward, and an electrically-driven mold opening/closing mechanism including a servo motor for driving the ball screw mechanism.

7. The mold clamping mechanism according to claim 6, wherein a ball screw shaft of the ball screw mechanism has a length corresponding to the maximum stroke of the movable die plate in usual opening/closing of molds.

8. The mold clamping mechanism according to claim 1, wherein each of the plurality of tie bars is provided with the tie bar retreating means.

* * * * *